US012415356B2

(12) United States Patent
Oya et al.

(10) Patent No.: US 12,415,356 B2
(45) Date of Patent: Sep. 16, 2025

(54) LIQUID EJECTION HEAD AND METHOD FOR MANUFACTURING THE SAME

(71) Applicant: CANON KABUSHIKI KAISHA, Tokyo (JP)

(72) Inventors: Shuhei Oya, Kanagawa (JP); Tomoaki Kamagata, Kanagawa (JP); Takashi Hayasaka, Kanagawa (JP); Satoshi Ideta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 18/479,716

(22) Filed: Oct. 2, 2023

(65) Prior Publication Data

US 2024/0109320 A1 Apr. 4, 2024

(30) Foreign Application Priority Data

Oct. 4, 2022 (JP) ................................ 2022-159883

(51) Int. Cl.
*B41J 2/14* (2006.01)

(52) U.S. Cl.
CPC .................................. *B41J 2/1433* (2013.01)

(58) Field of Classification Search
CPC ..................................................... B41J 2/1433
See application file for complete search history.

(56) References Cited

U.S. PATENT DOCUMENTS 11,207,889 B2 * 12/2021 Kitayama .............. B41J 2/1601
2010/0321446 A1 * 12/2010 Fujii ...................... B41J 2/2103 347/54
2015/0029265 A1 * 1/2015 Iwanaga .............. B41J 2/14072 347/50

FOREIGN PATENT DOCUMENTS

JP 2000177134 A 6/2000

* cited by examiner

*Primary Examiner* — Jason S Uhlenhake
(74) *Attorney, Agent, or Firm* — Canon U.S.A., Inc. IP Division

(57) ABSTRACT

A liquid ejection head includes an element substrate, an electric wiring board, a cover member, and a support member having a first through hole, a second through hole, and a support surface. The element substrate includes an ejection port and a pressure chamber to supply liquid to the ejection port. The cover member is joined to the support surface with a first adhesive. The support member supports the element substrate and the electric wiring board on the support surface. The first through hole serves as a flow passage through which the liquid is supplied to the pressure chamber and the second through hole opens in the support surface. The first adhesive is disposed in an outer peripheral region of the support surface of the support member. A space surrounded by the cover member, the support member, and the first adhesive communicates with the second through hole.

16 Claims, 11 Drawing Sheets

LIQUID EJECTION HEAD AND METHOD FOR MANUFACTURING THE SAME

BACKGROUND

Field

The present disclosure relates to a liquid ejection head and a method for manufacturing the liquid ejection head.

Description of the Related Art

A typical example of a liquid ejection head is an inkjet head included in an inkjet printer. The liquid ejection head ejects small drops (droplets) of liquid, such as ink, through ejection ports to form an image or the like on a recording medium.

The liquid ejection head generally includes an element substrate, a support member, and an electric wiring board. The element substrate has ejection ports through which liquid is ejected, and includes energy-generating elements. The support member supports the element substrate. The electric wiring board is used to supply electric signals for ejecting liquid to the energy-generating elements. A cover member having an opening at which the element substrate is exposed may be connected to the support member such that at least a portion of the electric wiring board is held between the cover member and the support member. The support member and the cover member are connected to each other with an adhesive, and the adhesive fills the gap between the support member and the cover member of the liquid ejection head. Thus, the electric wiring board disposed between the support member and the cover member is prevented from coming into contact with ink, and the electric reliability is improved.

When a thermosetting sealing material is used as the above-described adhesive, the adhesive needs to be applied without leaving air bubbles therein.

When the adhesive is applied such that closed spaces, such as air bubbles, are formed between the support member and the cover member, the adhesive may break as a result of thermal expansion of the closed spaces in a process of curing the adhesive by applying heat. Even after the liquid ejection head is manufactured, the adhesive may similarly break as a result of thermal expansion of the closed spaces when the adhesive is influenced by heat generated during use of the liquid ejection head or when the liquid ejection head is stored in a high-temperature environment. When the adhesive serving as the sealing material that seals the gap between the support member and the cover member breaks as described above, the electric reliability of the liquid ejection head may be affected.

Japanese Patent Laid-Open No. 2000-177134 describes a liquid ejection head having a structure in which a sealing material is applied over the entire region of a gap between a support member and a wiring board that serves as the above-described cover member. According to this structure, air bubbles (closed spaces) are not formed between the support member and the wiring board, and a liquid ejection head having a high degree of electric reliability can be obtained.

In recent years, a size of the element substrate of the above-noted typical example of a liquid ejection head has been increased to improve the quality of the recorded images and increase the print speed. As the substrate size increases, the support member and the cover member continue to be connected to each other with adhesive, but a greater amount of adhesive is used when the adhesive is applied over the entire region between the members to be bonded together as described above. This leads to an increase in cost.

SUMMARY

The present disclosure provides a liquid ejection head that has a higher degree of electric reliability and in which a smaller amount of adhesive is used and a method for manufacturing the liquid ejection head.

According to an aspect of the present disclosure, a liquid ejection head includes an element substrate having an ejection port through which liquid is to be ejected and having a pressure chamber configured to supply the liquid to the ejection port, an electric wiring board configured to supply an electric signal for ejecting the liquid to the element substrate, a support member supporting the element substrate and the electric wiring board on a support surface, and having a first through hole and a second through hole, and a cover member having an opening at which the element substrate is exposed, wherein the cover member is joined to the support surface of the support member with a first adhesive, wherein the first through hole serves as a flow passage through which the liquid is supplied to the pressure chamber and the second through hole opens in the support surface, wherein the first adhesive is disposed in an outer peripheral region of the support surface of the support member, and wherein a space surrounded by the cover member, the support member, and the first adhesive communicates with the second through hole.

Further features of the present disclosure will become apparent from the following description of exemplary embodiments with reference to the attached drawings.

DESCRIPTION OF THE EMBODIMENTS

Embodiments of the present disclosure will now be described with reference to the drawings. However, sizes, materials, shapes, relative arrangements, etc., of components described in the embodiments are not intended to limit the scope of the present disclosure unless specified otherwise. A liquid ejection head according to the present disclosure is suitable for application to an inkjet recording head configured to eject ink serving as liquid. The inkjet recording head is included in a liquid ejection apparatus (hereinafter referred to as also as an apparatus body) serving as an inkjet recording apparatus.

First Embodiment

Structure of Liquid Ejection Head

Figure 1A:
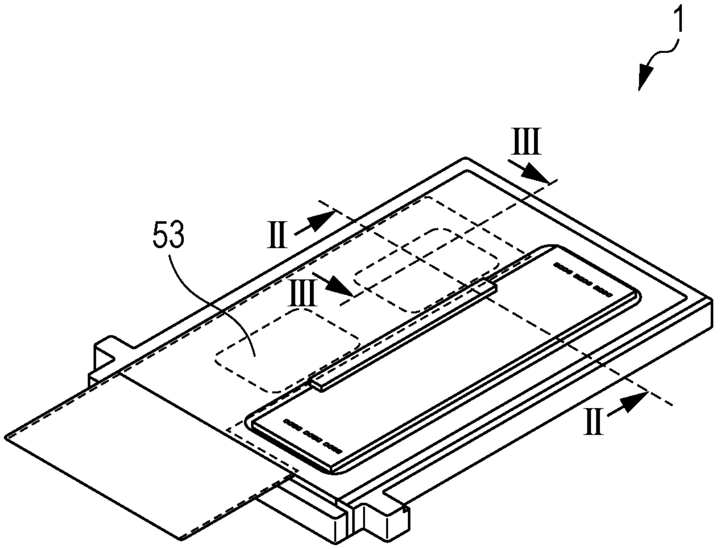
FIG. 1A is a perspective view of an example of a liquid ejection head according to the present disclosure.
Figure 1B:
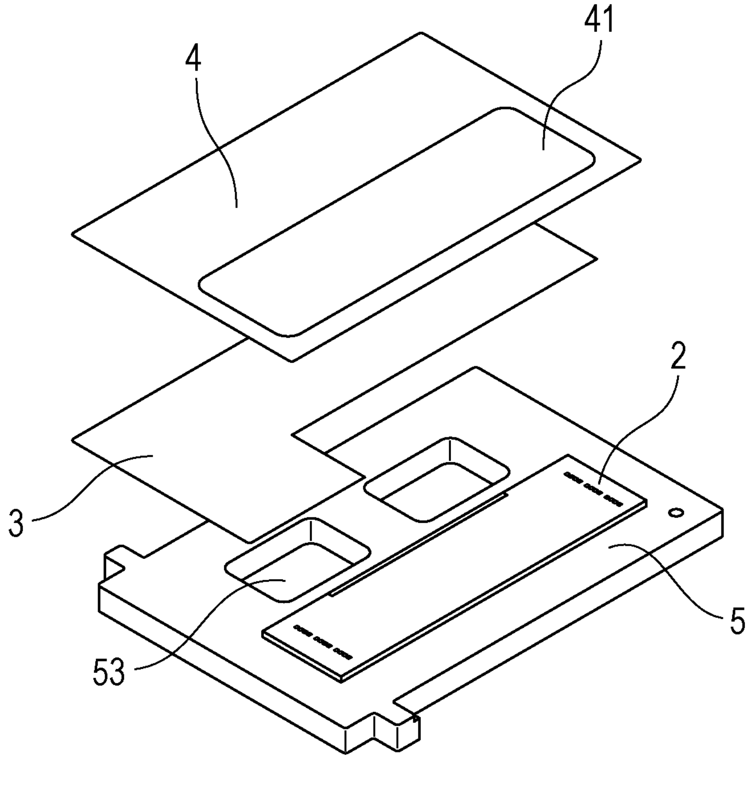
FIG. 1B is an exploded perspective view of the example of the liquid ejection head.
Figure 2:
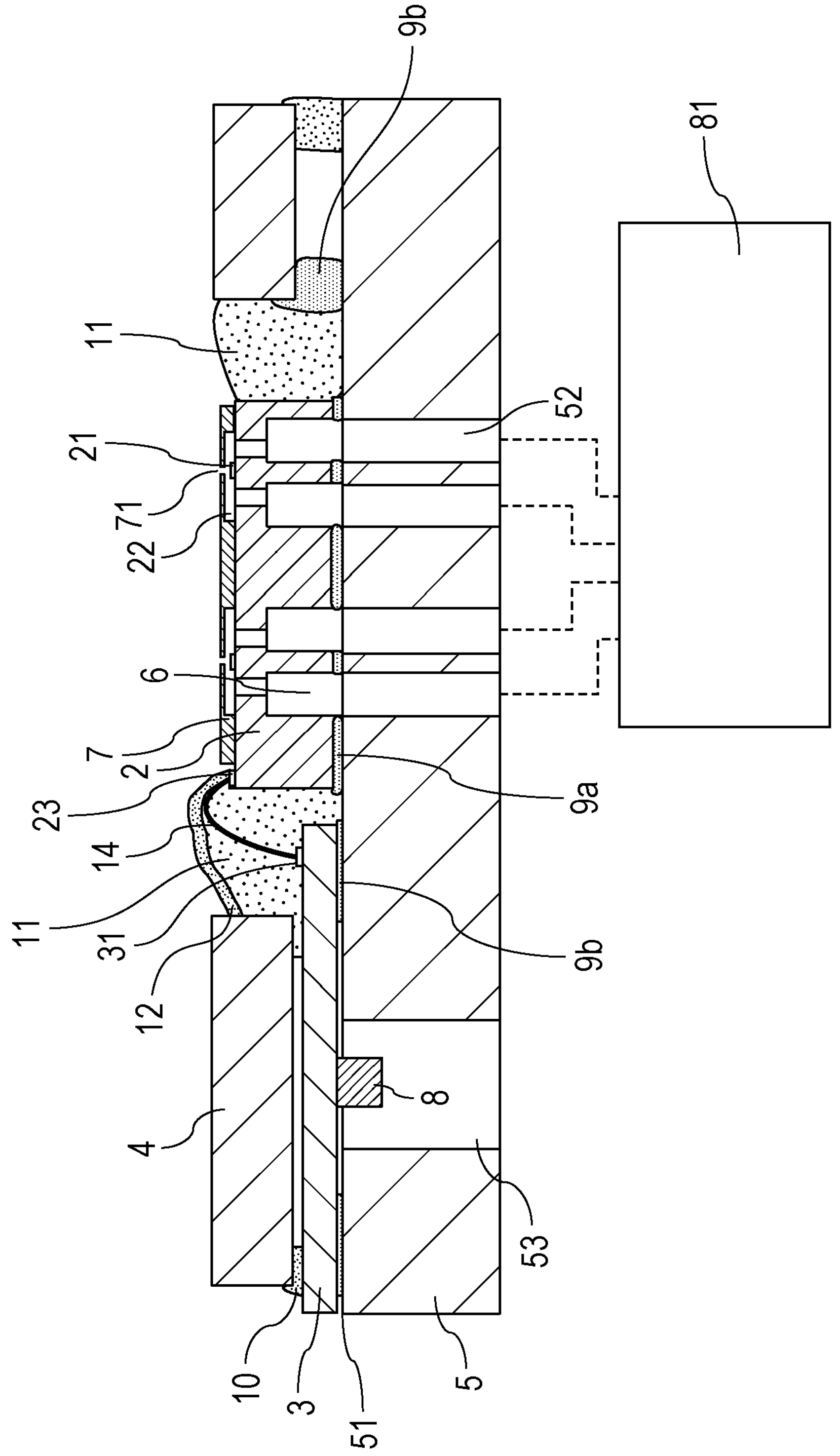
FIG. 2 is a sectional view of the example of the liquid ejection head according to the present disclosure taken along line II-II in FIG. 1A.
Figure 3:
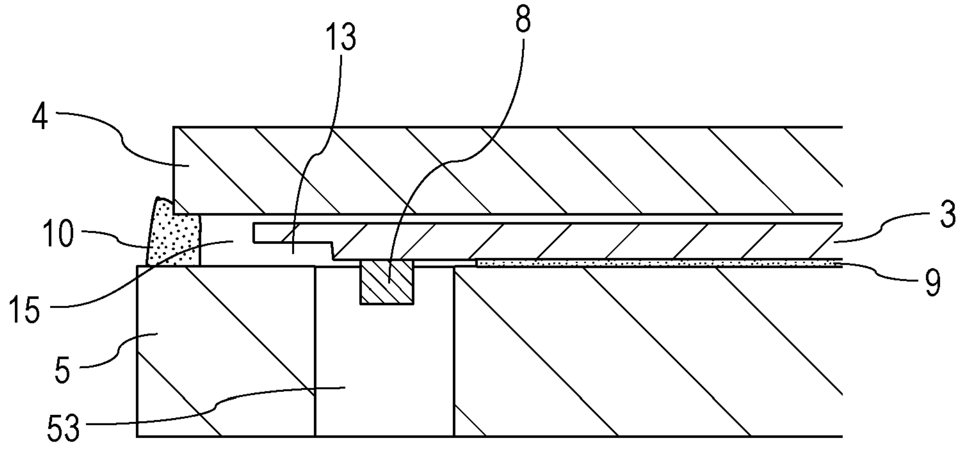
FIG. 3 is a sectional view of the example of the liquid ejection head according to the present disclosure taken along line III-III in FIG. 1A.

FIGS. 1A and 1B illustrate a liquid ejection head 1 serving as a liquid ejection head for ejecting ink serving as liquid. FIG. 1A is a perspective view, and FIG. 1B is an exploded perspective view corresponding to FIG. 1A. In FIG. 1A, the dotted lines show the positions of an electric wiring board 3 and through holes 53 formed in a support member 5 described below. FIG. 2 is a sectional view taken along line II-II in FIG. 1A, and FIG. 3 is a sectional view taken along line III-III in FIG. 1A.

The liquid ejection head 1 according to the present disclosure includes an element substrate 2 including elements for ejecting liquid; the electric wiring board 3 electrically connected to the element substrate 2; the support member 5 that supports the element substrate 2 and the electric wiring board 3; and a cover member 4. The cover member 4 has an opening 41 at which the element substrate 2 is exposed, and is disposed to face the support member 5 with at least a portion of the electric wiring board 3 disposed therebetween. The liquid ejection head 1 having the above-described structure ejects liquid, such as ink, stored in a tank 81. The tank 81 is simplified in FIG. 1.

The element substrate 2 is, for example, a silicon substrate, and has ink supply ports 6 extending therethrough. The ink supply ports 6 communicate with flow passages 52 formed in the support member 5 described below. Ink supplied from the outside of the head flows through the flow passages 52 and is supplied to the ink supply ports 6. The element substrate 2 includes energy-generating elements 21 that apply discharge energy to the ink and electric wires 14 electrically connected to respective ones of the elements. The element substrate 2 also includes a nozzle plate 7 at a side opposite to the side at which the element substrate 2 is connected to the support member 5. The nozzle plate 7 has ejection ports 71 through which the ink is discharged. The nozzle plate 7 and the element substrate 2 define pressure chambers 22 in which the energy-generating elements are disposed. The ink is supplied from the ink supply ports 6 to the pressure chambers 22, and is discharged through the ejection ports 71. The nozzle plate 7 may be formed integrally with the element substrate 2.

In the present embodiment, the element substrate 2 substantially has an elongated rectangular shape. Assuming that W is a length of short sides of the element substrate 2 and L is a length of long sides of the element substrate 2, the effects of the present disclosure can be obtained when $L/W \geq 2$ is satisfied. Preferably, $L/W \geq 3$ is satisfied, and more preferably, $L/W \geq 3.5$ is satisfied.

The electric wiring board 3 may be, for example, a flexible board. Electrode terminals 23 on the element substrate 2 are electrically connected to electrode terminals 31 on the electric wiring board 3 serving as an electric wiring member by, for example, wire bonding. Thus, the element substrate 2 is electrically connected to an apparatus body (for example, an inkjet printer) outside the head, and electric signals are transmitted from the apparatus body to the element substrate 2. The electric wiring board 3 having the above-described structure has a function of supplying electric signals for ejecting liquid to the element substrate 2.

The element substrate 2 and the electric wiring board 3 are fixed to a support surface of the support member 5 with an adhesive 9. The shape and material of the support member 5 are not particularly limited as long as the support member 5 is large enough to allow the element substrate 2 and the electric wiring board 3 to be mounted thereon. The material may be selected from a wide variety of materials including resins, ceramics, and metals. When the material of the adhesive 9 is a thermosetting adhesive, the support member 5 may be composed of, for example, a plate made of alumina, which has a high heat resistance and a low coefficient of linear expansion. The support member 5 has the flow passages 52 (first through holes) through which liquid flows to the ink supply ports 6 in the element substrate 2.

The cover member 4 is bonded to the electric wiring board 3 and the support member 5 with the adhesive 9 and an adhesive 10. In the opening 41 of the cover member 4, the space between the element substrate 2 and the cover member 4 is filled with a sealing material 11.

The liquid ejection head 1 is configured to be in a standby state, in which the liquid ejection head 1 is sealed by a cap unit included in the apparatus body, when the apparatus is not used. Therefore, a surface of the liquid ejection head that faces in a liquid ejection direction and that comes into in contact with the cap unit needs to be flat. In the structure according to the present disclosure, the liquid ejection head 1 includes the cover member, and therefore includes a flat region to come into contact with the cap unit.

The shape and material of the cover member 4 are not particularly limited as long as the cover member 4 has a flatness and size such that the cover member 4 can be installed in an apparatus (for example, inkjet printer) on which the liquid ejection head 1 is to be mounted. The material may be selected from a wide variety of materials including resins, ceramics, and metals. When the materials of the adhesive 9 and the adhesive 10 are a thermosetting adhesive, the material of cover member 4 may be, for example, alumina, which has a high heat resistance and a low coefficient of linear expansion.

In the present embodiment, as described above, the element substrate 2 substantially has an elongated rectangular shape, and the size thereof is greater than that in the related art. Accordingly, the electric wiring board 3 is required to have a greater allowable current. Therefore, as illustrated in FIGS. 2 and 3, capacitors 8 are provided on a surface of the electric wiring board 3 that is in contact with the support member 5. Accordingly, the support member 5 has the through holes 53 (second through holes) that accommodate the capacitors 8 and open at least in a support surface 51. When the electric wiring board 3 is disposed on the support member 5, the capacitors 8 are accommodated in the through holes 53. When the capacitors 8 come into contact with liquid, such as ink, the capacitors 8 may cause a quality issue, such as corrosion. Therefore, the capacitors 8 need to be sealed.

Figure 4A:
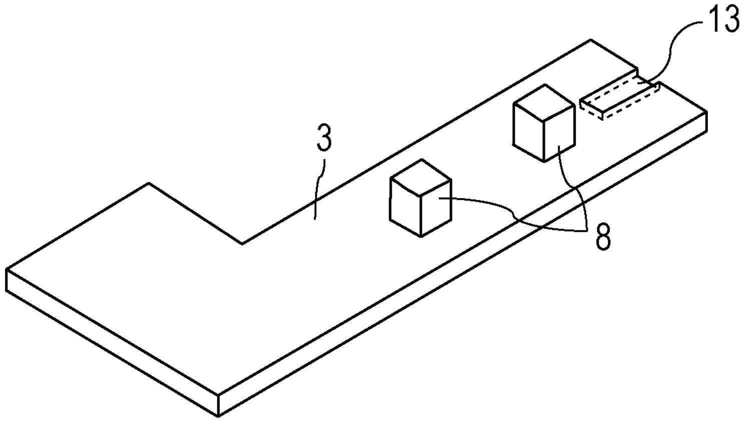
FIGS. 4A and 4B are perspective views of examples of an electric wiring board according to the present disclosure.
Figure 4B:
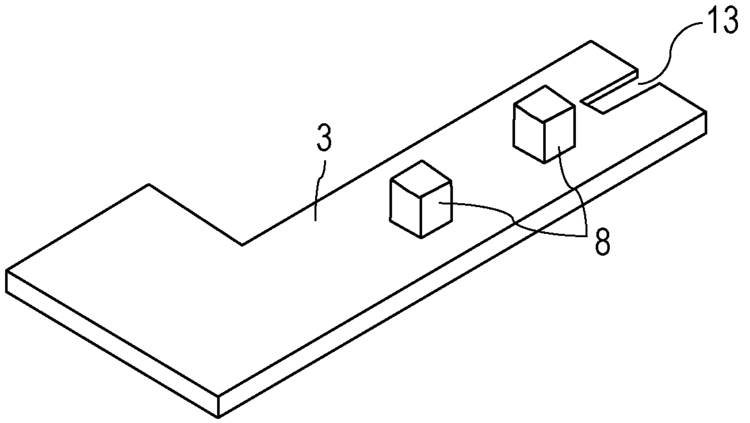

As illustrated in FIGS. 4A and 4B, each of which is a perspective view of the electric wiring board 3, the electric wiring board 3 has a recess 13 at a location close to the capacitors 8. The recess 13 may be a dent as illustrated in FIG. 4A or a slit as illustrated in FIG. 4B. When the liquid ejection head 1 is viewed from the liquid ejection direction, the recess 13 is long enough to overlap one of the through holes 53, and connects a space 15 to the one of the through holes 53 formed in the support member 5 (FIG. 3). The space 15 is a space surrounded at least by the cover member 4, the support member 5, and the adhesive 10. As illustrated in FIG. 3, the space 15 may be surrounded by the cover member 4, the support member 5, the adhesive 10, and the electric wiring board 3.

Manufacturing Method

Figure 5A:
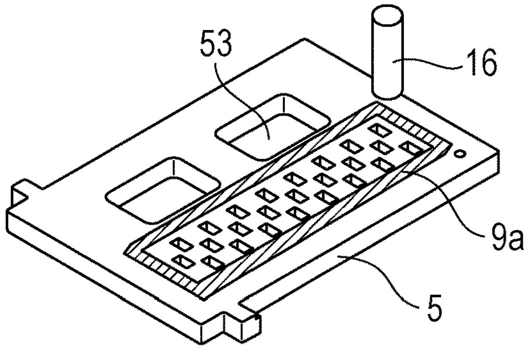
FIGS. 5A to 5D are perspective views illustrating examples of steps for manufacturing the liquid ejection head according to the present disclosure.

A method for manufacturing the liquid ejection head according to the present disclosure will be described with reference to FIGS. 5A to 5D. First, the support member 5 having the flow passages 52 and the through holes 53 is prepared. Next, as illustrated in FIG. 5A, an adhesive 9*a* used to fix the element substrate 2 to the support member 5 is applied. The material selected as the adhesive 9*a* is highly adhesive to the element substrate 2, the electric wiring board 3, and the support member 5 formed of, for example, a silicon substrate, a resin, or alumina, and resistant to ink that is ejected. In the present embodiment, a thermosetting epoxy-based adhesive is used. The adhesive can be applied by an air dispensing method in which the adhesive is discharged from a needle 16 of a dispenser.

Figure 5B:
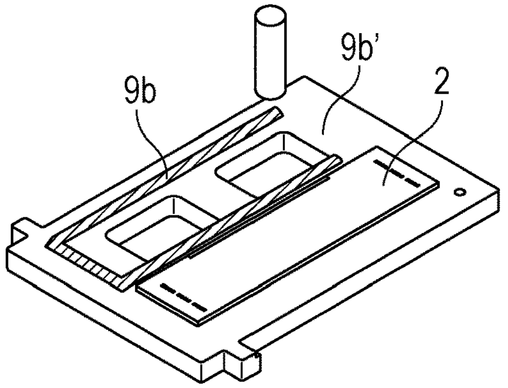

Next, as illustrated in FIG. 5B, the element substrate 2 is positioned on the applied adhesive 9*a*, and is bonded to the support member 5 by applying pressure.

Subsequently, an adhesive 9*b* (second adhesive) used to fix the electric wiring board 3 is applied.

The material of the adhesive 9*b* may be the same as that of the adhesive 9*a*. The adhesive 9*b* is applied along three sides of a rectangle surrounding the through holes 53. In FIGS. 5A to 5D, the support member has two through holes 53, and the adhesive 9*b* is applied along three sides of a substantially rectangular region in which the two through holes are disposed. The adhesive 9*b* may be applied in a pattern other than that illustrated in FIG. 5B as long as the adhesive 9*b* has a portion 9*b*' at which the adhesive 9*b* is discontinuous in a region between an end portion of the support member 5 and the through holes 53.

Figure 5C:
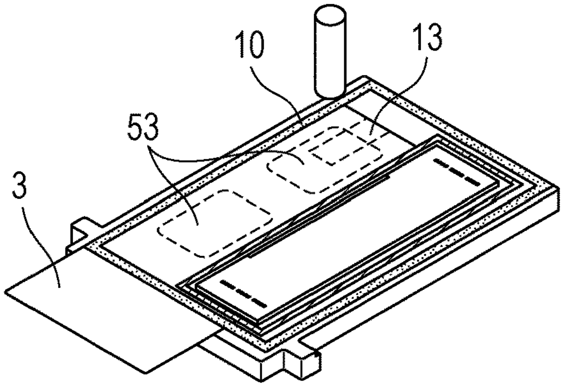

Subsequently, as illustrated in FIG. 5C, the electric wiring board 3 is positioned on the applied adhesive 9*b*, and is bonded to the support member 5 by applying pressure. In this step, the adhesive 9*b* is applied and the electric wiring board 3 is disposed so that the recess 13 in the electric wiring board 3 overlaps the discontinuous portion 9*b*' of the adhesive 9*b*.

Then, the adhesive 9 (adhesive 9*a* and adhesive 9*b*) is cured while load is applied to the element substrate 2 and the electric wiring board 3 so that the adhesive 9 is spread and reduced in thickness. In the present embodiment, the adhesive 9 is, for example, a thermosetting epoxy-based adhesive. Therefore, the adhesive 9 is cured by applying heat.

Next, the element substrate 2 and the electric wiring board 3 are electrically connected to each other. The electrode terminals 23 of the element substrate 2 are connected to the electrode terminals 31 of the electric wiring board 3 with the electric wires (wires) 14 by wire bonding. Thus, a wire group that serves as an electrical connection portion is provided (see FIG. 2).

Next, as illustrated in FIG. 5C, the adhesive 10 (first adhesive) used to join the cover member 4 is applied. The adhesive 10 is applied along four sides of the outer peripheral region of the support member 5. The adhesive 10 not only joins the cover member 4 to the support member 5 but also serves as a sealing material that prevents ink from coming into contact with the electric wiring board 3. Similarly to the adhesives 9*a* and 9*b*, the adhesive 10 may also be a thermosetting epoxy-based adhesive. The cover member 4 is positioned on the applied adhesive 10 and joined to the support member 5.

Figure 5D:
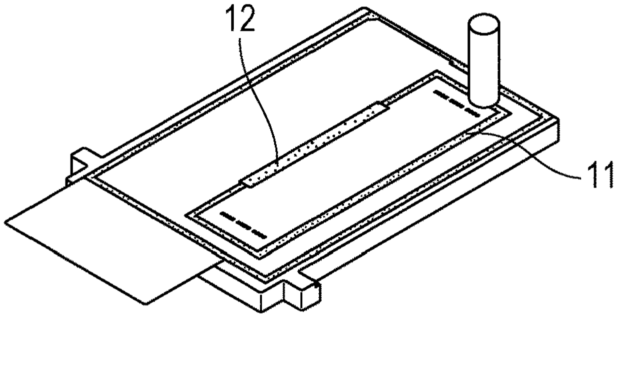

Next, as illustrated in FIG. 5D, the gap between the element substrate 2 disposed in the opening 41 and the cover member 4 is filled with the sealing material 11. The sealing material 11 is resistant to ink, and may be a material having a high flowability in a liquid state to seal the entire periphery of the element substrate 2. For example, the sealing material 11 may be an epoxy resin, an acrylic resin, an epoxy acrylate resin, an imide resin, an amide resin, or the like in a liquid state. To ensure sufficient flowability, the viscosity of the sealing material 11 in a liquid state may be 10 pascal-seconds (Pa·s) or less at a normal temperature. In the present embodiment, for example, the sealing material 11 is a thermosetting epoxy resin having a viscosity of 4 Pa·s in a liquid state when heated to a temperature immediately below the temperature at which curing starts. The gap between the element substrate 2 and the cover member 4 is uniformly filled with the sealing material 11 by moving the needle 16 along the periphery of the element substrate 2 while discharging the sealing material 11 without causing the sealing material 11 to spread onto the element substrate 2 or the cover member 4.

Next, the electrical connection portion is covered with a sealing material 12 to protect the electrical connection portion. The sealing material 12 is applied to a region above the wire group covered in the sealing material 11 (see FIG. 2). The sealing material 12 covers the region above the wire group to provide insulation and protection for the electrical connection portion, and may be resistant to ink. Similarly to the sealing material 11, the sealing material 12 may be an epoxy resin, an acrylic resin, an epoxy acrylate resin, an imide resin, an amide resin, or the like in a liquid state. The sealing material 12 may have a high viscosity so that the sealing material 12 does not flow toward the nozzle plate 7 and uncover the electrical connection portion. The viscosity of the sealing material 12 in a liquid state may be 100 Pa·s or more and 500 Pa·s or less at a normal temperature. In the present embodiment, for example, an epoxy resin-based sealing material having a viscosity of 300 Pa·s at a normal temperature is used.

The dotted lines in FIG. 5C show the positions of the recess in the structure illustrated in FIG. 4A and the through holes 53 below the electric wiring board 3. As described above, the electric wiring board 3 includes the capacitors 8 on a surface thereof that is joined to the support member 5, and the support member 5 has the through holes 53 that accommodate the capacitors 8. As illustrated in FIG. 5B, the adhesive 9*b* for joining the electric wiring board 3 and the support member 5 together has the portion 9*b*' at which the adhesive 9*b* is discontinuous in a region between an end portion of the support member 5 and the through holes 53, so that the adhesive 9*b* does not overlap the recess 13 in the electric wiring board 3. Therefore, in FIG. 3, the end portion of the electric wiring board 3 disposed on the portion 9*b*' is not bonded to the support member 5.

Figure 6:
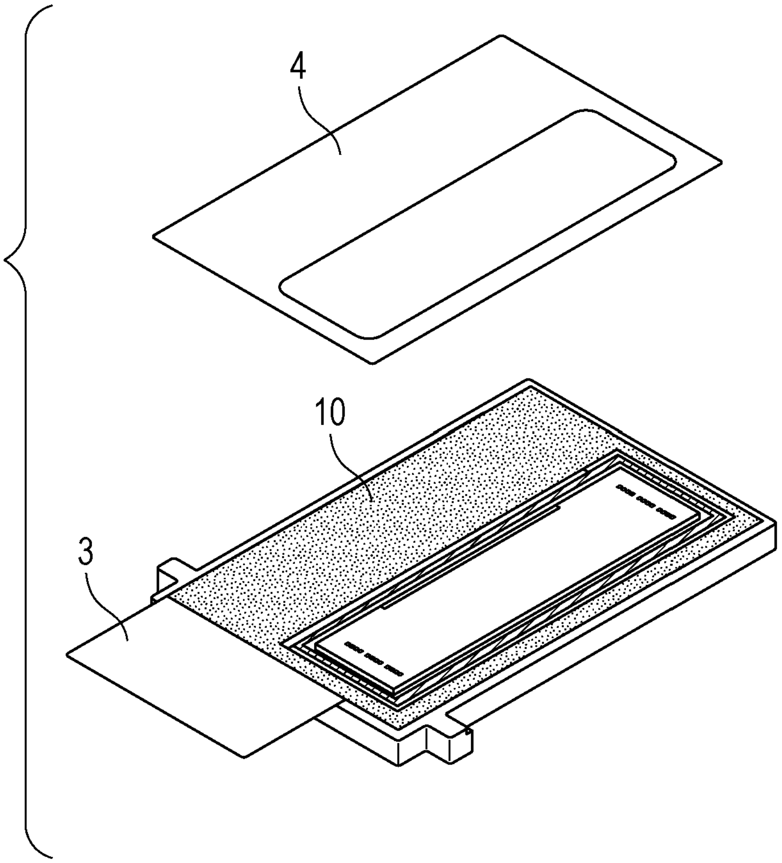
FIG. 6 RELATED ART
FIG. 6 is a perspective view illustrating an example of a step for manufacturing a liquid ejection head according to a comparative example.

Unlike a comparative example (FIG. 6) in which the adhesive 10 is applied over the entire region that comes into contact with the cover member 4, in the present embodiment, the adhesive 10 is applied only along the outer peripheral portion of the support member 5. Therefore, the space 15 surrounded by the support member 5, the cover member 4, the sealing material 10, and the electric wiring board 3 is formed. FIG. 6 is a perspective view of a liquid ejection head according to the comparative example during manufacture thereof, and corresponds to FIG. 5C in the present embodiment. If the space 15 is a closed space when the sealing materials 10 and 11 are cured by applying heat, the air trapped in the space 15 expands due to the applied heat, and the sealing material 10 may break. Therefore, according to the related art, as illustrated in FIG. 6, the adhesive 10 is applied over the entire region in which the support member 5 overlaps the cover member, so that no closed space is formed. As described above, when the size of the element substrate 2 and the support member 5 is increased, the amount of the adhesive 10 to be used increases, and this leads to a significant increase in cost.

Figure 7:
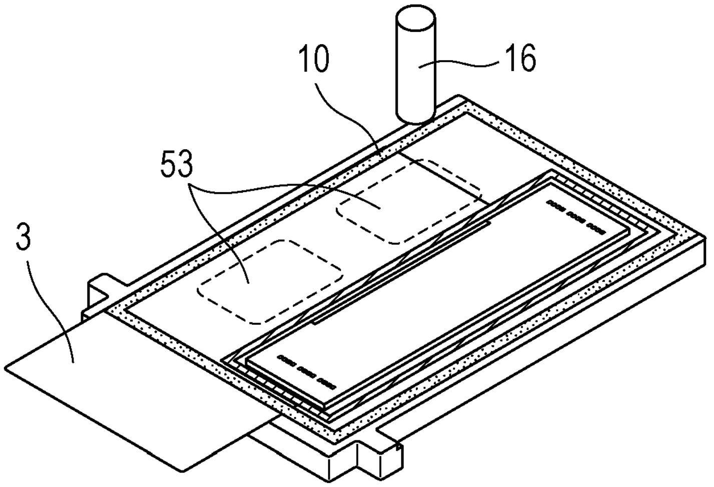
FIG. 7 is a perspective view illustrating an example of a step for manufacturing the liquid ejection head according to the present disclosure.

In the structure of the present disclosure, the air in the space 15 surrounded by the support member 5 and the cover member 4 can flow downward from the support member 5 through the recess 13 formed in the electric wiring board 3 and one of the through holes 53. Therefore, breakage of the sealing material due to expansion of the air can be prevented. This effect of the present disclosure can be obtained as long as the space 15 communicates with one of the through holes 53 that open in the support surface 51 of the support member 5. In the present embodiment, the through holes 53 are provided to accommodate the capacitors 8. However, the capacitors 8 may be omitted as long as the liquid ejection head 1 has the through holes 53. Even when the recess 13 is not provided, when the electric wiring board 3 is disposed such that the electric wiring board 3 does not entirely cover the through holes 53, as illustrated in FIG. 7, the effect of the present disclosure can be provided because the space 15 communicates with one of the through holes 53. In this case, the space 15 may communicate with one of the through holes 53 through the discontinuous portion 9*b*' of the adhesive 9*b*. FIG. 7 corresponds to FIG. 5C, and illustrates a manufacturing step according to the present disclosure in which no recess 13 is formed.

Second Embodiment

Description of elements that are the same as those in the first embodiment will be omitted.

Figure 8:
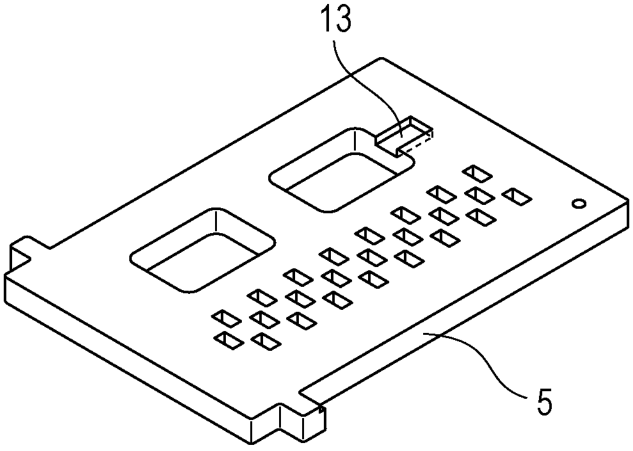
FIG. 8 illustrates an example of a support member according to a second embodiment of the present disclosure.
Figure 9:
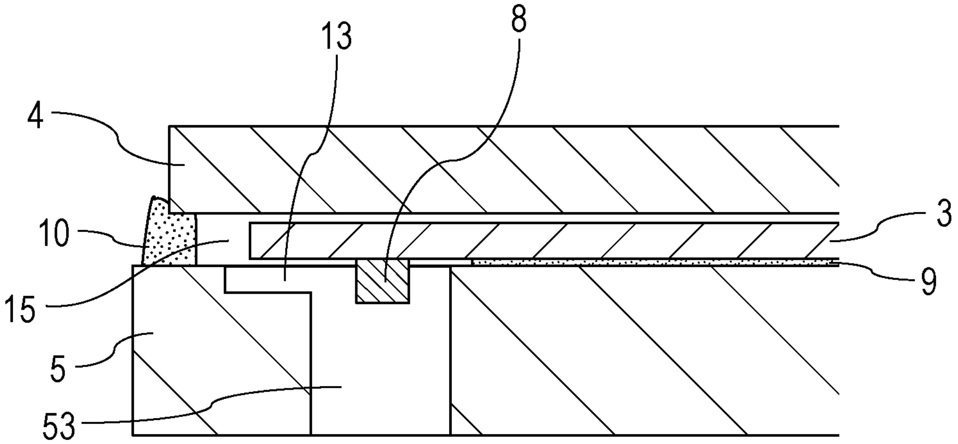
FIG. 9 is a sectional view of an example of a liquid ejection head according to a second embodiment of the present disclosure.

FIGS. 8 and 9 illustrate a liquid ejection head according to a second embodiment of the present disclosure.

FIG. 8 is a perspective view of the support member 5, and FIG. 9 is a sectional view of the liquid ejection head corresponding to FIG. 3. The second embodiment differs from the first embodiment in that the recess 13 is formed in the support member 5 instead of the electric wiring board 3. In the first embodiment, the recess 13 through which the space 15 communicates with one of the through holes 53 is formed in the electric wiring board 3. In the second embodiment, the recess 13 is formed in the support member 5. The recess 13 is formed to extend to an outer edge of the electric wiring board 3, so that the space 15 surrounded by the cover member 4 and the support member 5 communicates with one of the through holes 53 formed in the support member 5. Thus, the space 15 is not formed as a closed space in which air is trapped.

Figure 10:
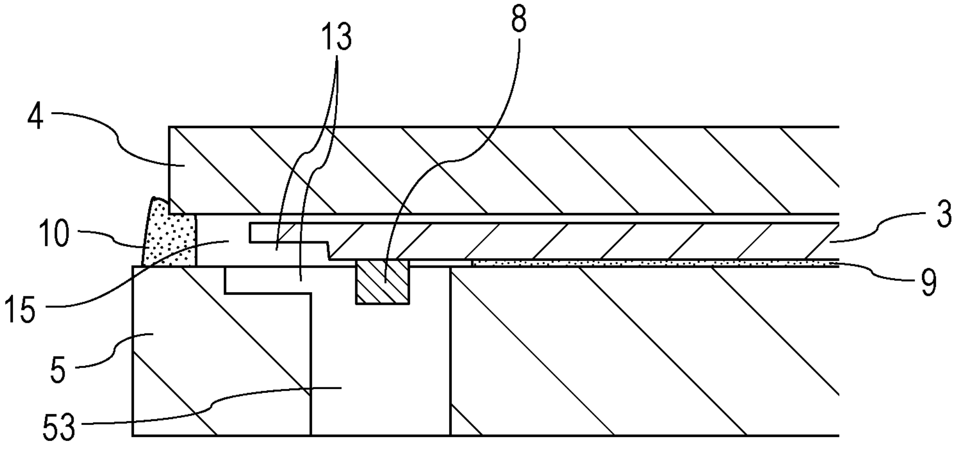
FIG. 10 is a sectional view of another example of a liquid ejection head according to the second embodiment of the present disclosure.

Although the recess 13 is formed in one of the electric wiring board 3 and the support member 5 in the first and second embodiments, the recess 13 is not limited to this as long as the recess 13 connects the space 15 to a through hole formed in the support member 5. As illustrated in FIG. 10, the recess 13 may be formed in both the electric wiring board 3 and the support member 5. In addition, a plurality of recesses may be provided.

Third Embodiment

Description of elements that are the same as those in the above-described embodiments will be omitted.

Figure 11A:
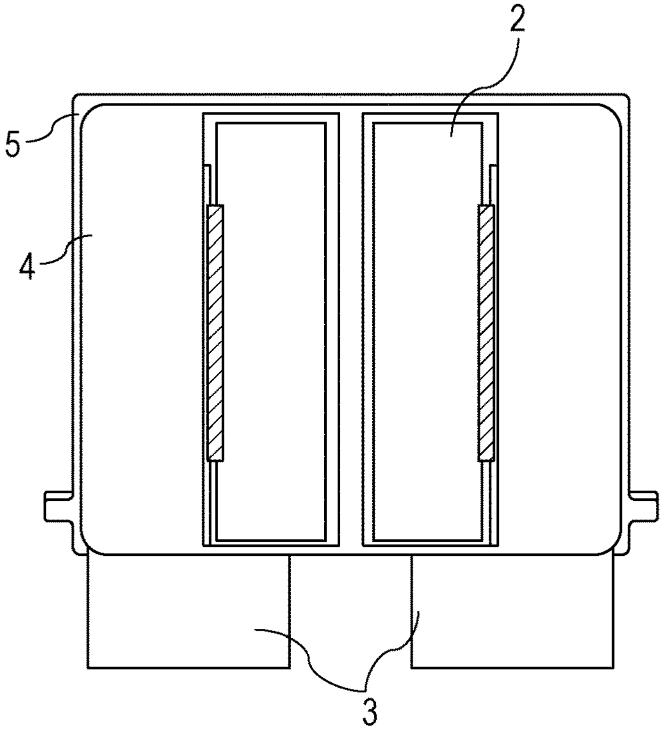
FIGS. 11A and 11B illustrate an example of a liquid ejection head according to a third embodiment of the present disclosure.
Figure 11B:
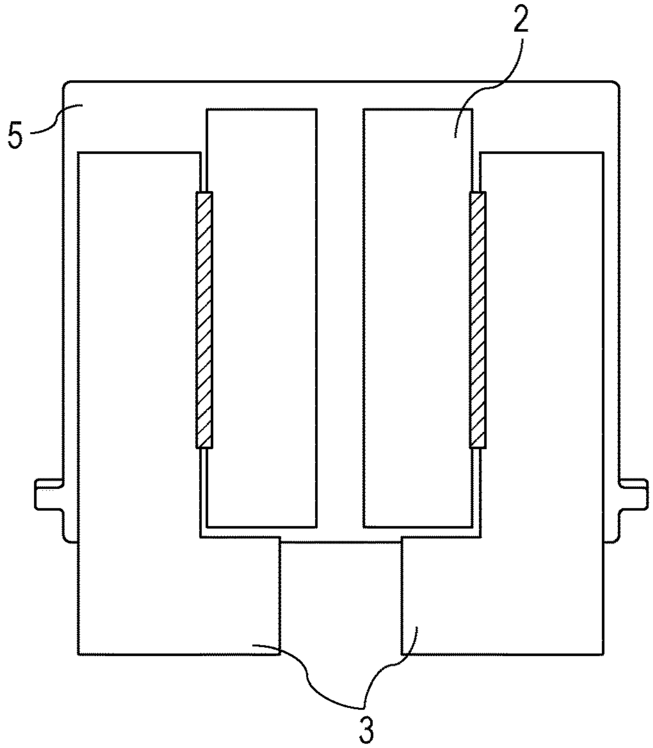
Figure 12A:
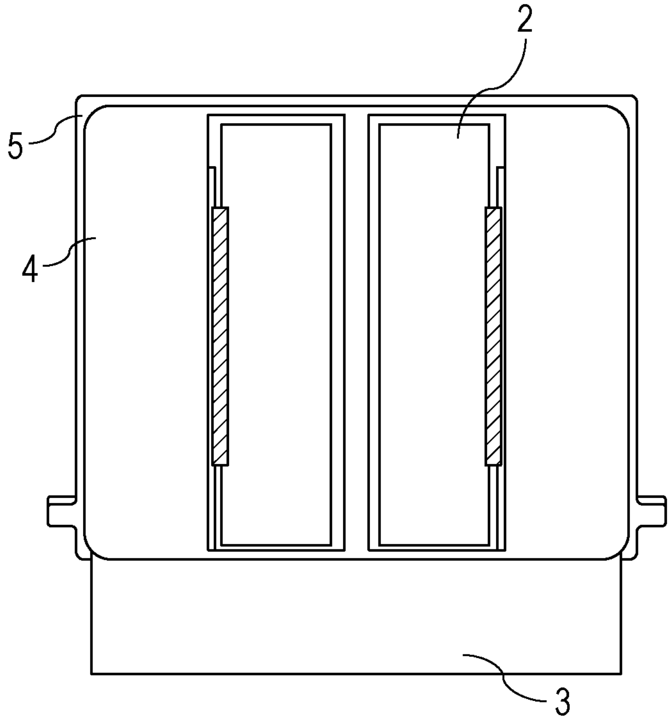
FIGS. 12A and 12B illustrate another example of a liquid ejection head according to the third embodiment of the present disclosure.
Figure 12B:
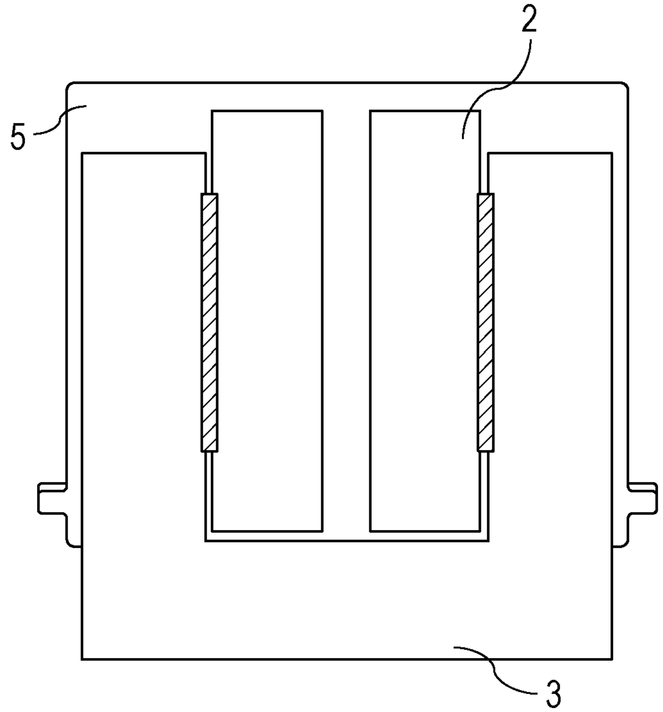

FIGS. 11A and 11B and FIGS. 12A and 12B illustrate liquid ejection heads according to a third embodiment of the present disclosure. FIGS. 11B and 12B illustrate the liquid ejection heads from which cover members 4 illustrated in FIGS. 11A and 12A are removed. As illustrated in FIGS. 11A and 11B and FIGS. 12A and 12B, the present disclosure may be suitably applied to liquid ejection heads including a plurality of element substrates 2 on the support member 5. As illustrated in FIGS. 11A and 11B, the element substrates 2 may be individually connected to respective ones of electric wiring boards 3. Alternatively, as illustrated in FIGS. 12A and 12B, the element substrates 2 may be connected to a common electric wiring board 3.

Fourth Embodiment

Description of elements that are the same as those in the above-described embodiments will be omitted.

Figure 13A:
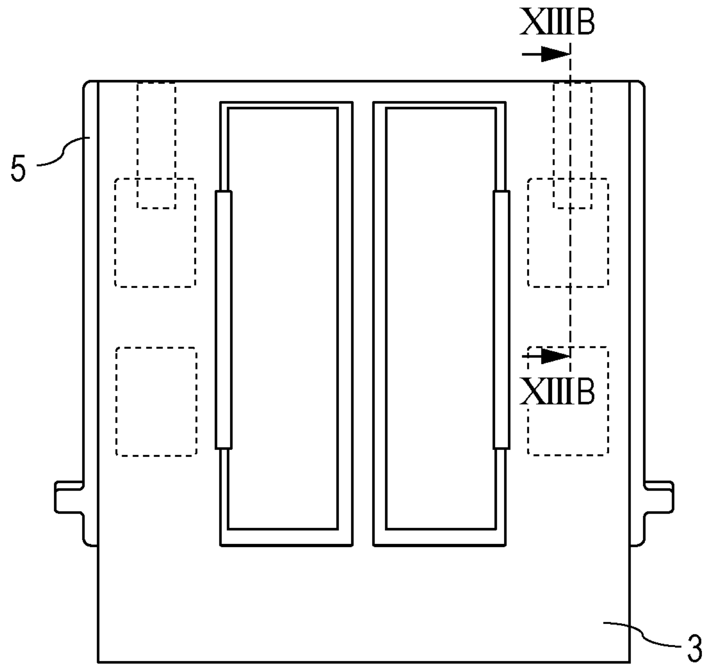
FIG. 13A illustrates an example of a liquid ejection head according to a fourth embodiment of the present disclosure.
Figure 13B:
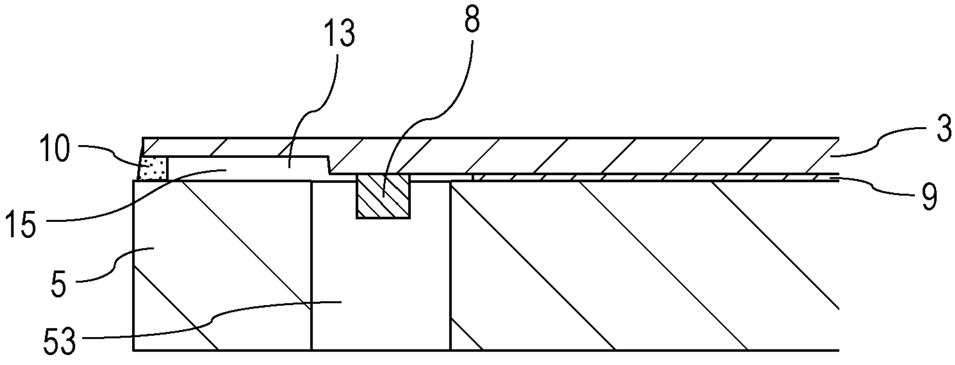
FIG. 13B is a sectional view of FIG. 13A taken along line XIIIB-XIIIB.

FIGS. 13A and 13B illustrate a liquid ejection head according to a fourth embodiment of the present disclosure. FIG. 13B is a sectional view of FIG. 13A taken along line XIIIB-XIIIB The dotted lines in FIG. 13A show the positions of the recesses 13 formed in a surface of the electric wiring board 3 facing the support surface 51 and the through holes 53 below the electric wiring board 3. In the present embodiment, the electric wiring board 3 extends over the entire surface of the support member 5 when viewed in a direction perpendicular to a flat surface of the support member 5, and thereby serves also as the cover member 4 in the above-described embodiments. The present disclosure may also be suitably applied to a liquid ejection head having the above-described structure. In the present embodiment, for example, as illustrated in FIG. 13B, the space 15 surrounded by the electric wiring board 3, the support member 5, and the adhesive 10 communicates with the through holes 53 through the recesses 13 formed in the electric wiring board 3.

The present disclosure provides a liquid ejection head that has a higher degree of electric reliability and in which a smaller amount of adhesive is used and a method for manufacturing the liquid ejection head.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-159883 filed Oct. 4, 2022, which is hereby incorporated by reference herein in its entirety.

What is claimed is:

1. A liquid ejection head comprising:

an element substrate having an ejection port through which liquid is to be ejected and having a pressure chamber configured to supply the liquid to the ejection port;

an electric wiring board configured to supply an electric signal for ejecting the liquid to the element substrate;

a support member supporting the element substrate and the electric wiring board on a support surface, and having a first through hole and a second through hole; and a cover member having an opening at which the element substrate is exposed, wherein the cover member is joined to the support surface of the support member with a first adhesive, wherein the first through hole serves as a flow passage through which the liquid is supplied to the pressure chamber and the second through hole opens in the support surface, wherein the first adhesive is disposed in an outer peripheral region of the support surface of the support member, and wherein a space surrounded by the cover member, the support member, and the first adhesive communicates with the second through hole.

2. The liquid ejection head according to claim 1, wherein at least a portion of the electric wiring board is disposed between the support member and the cover member.

3. The liquid ejection head according to claim 2, wherein the electric wiring board is joined to the support member with a second adhesive, and wherein the second adhesive on the support member is discontinuous in a region in which the space communicates with the second through hole.

4. The liquid ejection head according to claim 1, wherein the space is surrounded by the cover member, the support member, the first adhesive, and the electric wiring board.

5. The liquid ejection head according to claim 4, wherein the electric wiring board has a recess, and the space communicates with the second through hole through the recess.

6. The liquid ejection head according to claim 4, wherein the electric wiring board includes a capacitor, and the second through hole is configured to accommodate the capacitor.

7. The liquid ejection head according to claim 4, wherein the electric wiring board serves as the cover member.

8. The liquid ejection head according to claim 1, wherein the support member has a recess, and the space communicates with the second through hole through the recess.

9. The liquid ejection head according to claim 1, wherein the electric wiring board is a flexible board.

10. The liquid ejection head according to claim 1, wherein the element substrate has a substantially rectangular shape, and when W is a length of short sides of the element substrate and L is a length of long sides of the element substrate, $L/W \geq 3$ is satisfied.

11. The liquid ejection head according to claim 1, wherein the first adhesive is a thermosetting adhesive and is configured to be cured by applying heat.

12. An inkjet printer comprising:

the liquid ejection head according to claim 1; and an apparatus body, wherein the element substrate is electrically connected to the apparatus body of the inkjet printer outside the liquid ejection head, and the element substrate is configured to receive electric signals transmitted from the apparatus body to element substrate.

13. A method for manufacturing a liquid ejection head, wherein the liquid ejection head includes:

an element substrate having an ejection port through which liquid is to be ejected and having a pressure chamber configured to supply the liquid to the ejection port, an electric wiring board configured to supply an electric signal for ejecting the liquid to the element substrate, a support member supporting the element substrate and the electric wiring board on a support surface, and having a first through hole and a second through hole where the first through hole serves as a flow passage through which the liquid is supplied to the pressure chamber and the second through hole opens in the support surface, and a cover member having an opening at which the element substrate is exposed, the method comprising:

fixing the element substrate and the electric wiring board to the support member;

applying a first adhesive in an outer peripheral region of the support surface of the support member;

joining the cover member to the support surface of the support member with the first adhesive; and curing the first adhesive by applying heat, wherein a space surrounded by the cover member, the support member, and the first adhesive communicates with the second through hole.

14. The method according to claim 13, wherein the fixing includes joining the electric wiring board to the support surface of the support member with a second adhesive and, in the joining of the cover member to the support surface, at least a portion of the electric wiring board is disposed between the support member and the cover member.

15. The method according to claim 13, wherein the space is surrounded by the cover member, the support member, the first adhesive, and the electric wiring board.

16. The method according to claim 15, further comprising providing a recess in at least one of the electric wiring board and the support member where the space communicates through the recess with the second through hole.

* * * * *